April 15, 1924.

C. E. STEVENS ET AL 1,490,348

BOTTLE CAP

Filed Jan. 11, 1923

Inventors
C. E. Stevens
J. W. McDonald
By John A. Bommhardt
Atty.

Patented Apr. 15, 1924.

1,490,348

UNITED STATES PATENT OFFICE.

CLARENCE E. STEVENS AND JOHN W. McDONALD, OF CLEVELAND, OHIO.

BOTTLE CAP.

Application filed January 11, 1923. Serial No. 612,023.

*To all whom it may concern:*

Be it known that we, CLARENCE E. STEVENS and JOHN W. McDONALD, citizens of the United States, residing at Cleveland, in the county of Cuyahoga and State of Ohio, have invented certain new and useful Improvements in Bottle Caps, of which the following is a specification.

This invention relates to bottle caps particularly adapted and intended for use on milk bottles, but capable of use on other vessels when desired.

The object of the invention is to provide an improved cap which can be applied to or removed from a milk bottle or the like, the intention being to change the cap from one bottle to another on occasion.

The device includes a clip which may be slipped on or off the neck of the bottle, and a pivoted cap provided with a handle, and with a spring which will ordinarily keep the lid closed tightly against the mouth of the bottle.

Figure 1:
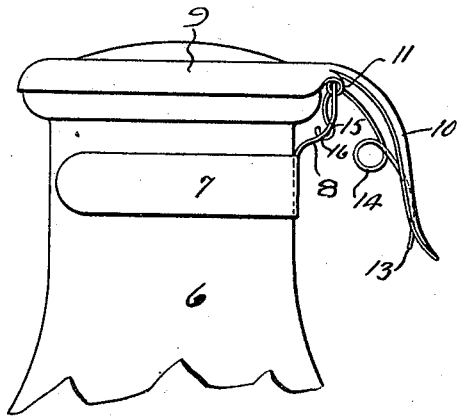
Figure 2:
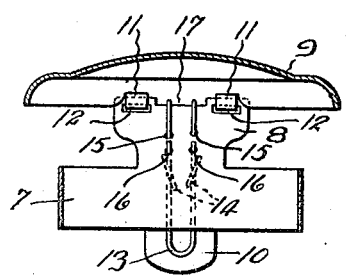

The invention is illustrated in the accompanying drawings in which Fig. 1 is a side elevation of a bottle provided with the cap or closure. Fig. 2 is a vertical section of the cap.

In the drawings, 6 indicates a milk or other bottle to which the closure is applied. A U-shaped clip 7, made of spring metal, is adapted to be fitted on the neck of the bottle whereby to support the cap in place, and this cap can be slipped on or off to change the closure from one bottle to another. A bracket 8 is formed integral with the clip, and projects upwardly and outwardly to position the top of the same adjacent the rim of the bottle. The lid 9 consists of a piece of stamped metal having a handle extension 10 depending at one edge thereof, and this lid is hinged to the bracket by means of two tongues 11, one of which is located at each side of the handle, these tongues being bent through slots at 12 in the upper edge of the bracket 8, thereby forming a hinge joint which permits the lid to swing open or closed.

The lid is normally held closed against the mouth of the bottle by means of a spring consisting of a piece of wire bent to form a loop at 13 which presses upwardly against the inner side of the handle. Each arm of the spring is bent to form a coil 14 and is then extended and bent upwardly over the edge of the bracket 8 and thence downwardly through a hole 15 in the bracket, and then forwardly or inwardly through another hole 16, forming a hook which holds the arm of the spring in place and retains the spring in position. The upper edge of the bracket 8 is notched as indicated at 17, where the arms of the spring are bent over the top of the bracket, and this assists in holding the spring in place.

By pressing down on the handle the lid may be lifted against the tension of the spring, which will return the lid to closed position when the handle is released.

As stated, the cap may be slipped over and changed from one bottle to another.

The device may be very cheaply constructed by stamping the clip and the lid from sheet metal, and the sections assembled with the spring at slight expense.

We claim:

A detachable bottle cap comprising a clip having a bracket projecting upwardly at one side thereof, the bracket having a pair of slots near its upper edge and a notched portion between the slots, a lid provided with a handle and having hinged tongues projecting through the slots, and a spring consisting of a wire loop pressing under the handle, the arms of the loop being bent over the bracket in said notch and being engaged in holes in the bracket below said notch.

In testimony whereof, we affix our signatures in presence of a witness.

CLARENCE E. STEVENS.
JOHN W. McDONALD.

Witness:
BESSIE F. POLLAK.